US009759150B2

(12) United States Patent
Ohori et al.

(10) Patent No.: US 9,759,150 B2
(45) Date of Patent: Sep. 12, 2017

(54) AUTOMOBILE WITH FUEL INJECTION CONTROLLER

(71) Applicant: TOYOTA JIDOSHA KABUSHIKI KAISHA, Toyota-shi, Aichi-ken (JP)

(72) Inventors: Shinya Ohori, Toyota (JP); Yoshiaki Ito, Toyota (JP); Makoto Yamazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 44 days.

(21) Appl. No.: 15/041,354

(22) Filed: Feb. 11, 2016

(65) Prior Publication Data

US 2016/0237934 A1  Aug. 18, 2016

(30) Foreign Application Priority Data

Feb. 16, 2015 (JP) .................................. 2015-27646

(51) Int. Cl.
| | | |
|---|---|---|
| *F02D 41/18* | (2006.01) | |
| *F02M 61/14* | (2006.01) | |
| *F02D 41/04* | (2006.01) | |
| *F02D 41/06* | (2006.01) | |
| *F02D 41/34* | (2006.01) | |
| *F02M 35/10* | (2006.01) | |

(52) U.S. Cl.
CPC ......... *F02D 41/182* (2013.01); *F02D 41/047* (2013.01); *F02D 41/062* (2013.01); *F02D 41/34* (2013.01); *F02M 61/145* (2013.01); *F02D 2200/0402* (2013.01); *F02D 2200/0408* (2013.01); *F02M 35/1038* (2013.01); *Y02T 10/44* (2013.01)

(58) Field of Classification Search
CPC .... F02D 41/182; F02D 41/047; F02D 41/062; F02D 41/34; F02D 2200/0402; F02D 2200/0408; F02M 61/145; F02M 35/1038; Y02T 10/44
USPC ........................................................ 123/478
See application file for complete search history.

(56) References Cited

U.S. PATENT DOCUMENTS 4,949,693 A * 8/1990 Sonoda ................. F02D 41/045
                                                              123/491
5,282,449 A    2/1994 Takahashi et al.
5,701,871 A   12/1997 Munakata et al.
(Continued)

FOREIGN PATENT DOCUMENTS

JP           5-65845        3/1993
JP           7-229435       8/1995
(Continued)

*Primary Examiner* — Joseph Dallo
*Assistant Examiner* — Yi-Kai Wang
(74) *Attorney, Agent, or Firm* — Finnegan, Henderson, Farabow, Garrett & Dunner, LLP

(57) ABSTRACT

On start of an engine, a difference ΔPm between a first intake pipe pressure Pm1 and a second intake pipe pressure Pm2 is computed. Reduction correction of wall surface deposition correction is prohibited until the state that the difference ΔPm is equal to or less than a reference value ΔPmref continues over a predetermined number of strokes nref of the engine. After the state that the difference ΔPm is equal to or less than the reference value ΔPmref continues over the predetermined number of strokes nref of the engine, permission is given for the reduction correction.

2 Claims, 11 Drawing Sheets

(56) References Cited

U.S. PATENT DOCUMENTS

2004/0094120 A1* 5/2004 Kishibata ............. F02D 41/123
                                                      123/325
2006/0207241 A1   9/2006 Araki et al.

FOREIGN PATENT DOCUMENTS

| JP | 8-74621 | 3/1996 |
| JP | 8-232710 | 9/1996 |
| JP | 2002-168151 | 6/2002 |
| JP | 2006-258007 | 9/2006 |
| JP | 2007-239484 | 9/2007 |

* cited by examiner

US 9,759,150 B2

AUTOMOBILE WITH FUEL INJECTION CONTROLLER

This application claims priority to Japanese Patent Application No. 2015-27646 filed 16 Feb., 2015, the contents of which is incorporated herein by reference.

TECHNICAL FIELD

The present invention relates to an automobile and more specifically an automobile equipped with an engine.

BACKGROUND ART

A control device of the engine has been proposed (for example, Patent Literature 1). In the engine, when a fuel is injected from an injector, part of the injected fuel is directly taken into a combustion chamber as direct intake part, while remaining part deposits on an inner wall surface of an intake passage. In the course of taking the direct intake part into the combustion chamber, part of the fuel depositing on the inner wall surface is vaporized and is taken into the combustion chamber as additional intake part. The proposed control device of the engine performs fuel injection control as described below by taking into account the foregoing. The fuel injection control first sets a base pulse width based on the amount of intake air and the rotation speed of the engine and sets a required amount of injection (pulse width) by multiplying the base pulse width by various correction factors and constants. The required amount of injection is then corrected by wet correction of an intake manifold (predicted correction) based on prediction of the direct intake part and the additional intake part. The fuel injection control is then performed with an amount of fuel (pulse width) to be injected from the injector. At a time of starting the engine, the control device of the engine prohibits the wet correction of the intake manifold until satisfaction of a predetermined condition. The predetermined condition employed is a condition that the rotation speed of the engine becomes equal to or higher than a predetermined rotation speed and that the intake air-filling efficiency decreases to or below a first set value and then increases above an averaged value such that the difference becomes equal to or greater than a second set value. Such control is supposed to suppress the wet correction of the intake manifold for decreasing the amount of fuel in the state that the condition of fuel deposition is not accurately detectable at the time of starting or immediately after starting and thereby suppress reduction of the rotation speed of the engine.

CITATION LIST

Patent Literature

Patent Literature 1: JP H08-74621A

SUMMARY OF INVENTION

Technical Problem

The automobile equipped with the control device of the engine described above is, however, likely to extend a time duration between starting of the engine and a start of wet correction of the intake manifold. The extended time duration is likely to shift the air-fuel ratio to the rich side, increase the uncombusted fuel and cause deterioration of emission in the case where a required output of the engine is reduced in a relatively short time period after starting of the engine.

With regard to the automobile, an object of the invention is to suppress deterioration of emission.

Solution to Problem

In order to solve at least part of the problems described above, the automobile of the invention may be implemented by the following aspects or configurations.

According to one aspect of the invention, there is provided an automobile including: an engine that is configured to have a fuel injection valve that injects a fuel into an intake pipe; and a controller that is configured to set a target amount of fuel injection by providing a base amount of fuel injection with increase correction or reduction correction corresponding to a change in amount of the fuel depositing on a wall surface of the intake pipe and to control the engine to cause the fuel of the target amount of fuel injection to be injected by the fuel injection valve, wherein the controller prohibits the reduction correction until satisfaction of a predetermined condition since a start of the engine and gives permission for the reduction correction on satisfaction of the predetermined condition, wherein the predetermined condition is a condition satisfied when a difference between a first intake pipe pressure and a second intake pipe pressure becomes equal to or less than a predetermined value, wherein the first intake pipe pressure is a current pressure in the intake pipe estimated using a throttle-passing air flow that denotes a flow rate of the air passing through a throttle valve per unit time at a current throttle position, and the second intake pipe pressure is a pressure in the intake pipe when the throttle-passing air flow is equal to an in-cylinder intake air flow that denotes a flow rate of the air flowing into a combustion chamber per unit time.

The automobile of this aspect provides the base amount of fuel injection with either increase correction or reduction correction corresponding to a change in amount of the fuel depositing on the wall surface of the intake pipe to set the target amount of fuel injection, and controls the engine to cause the fuel of the target amount of fuel injection to be injected from the fuel injection valve. The automobile of this aspects prohibits the reduction correction until satisfaction of the predetermined condition since a start of the engine, while giving permission for the reduction correction on satisfaction of the predetermined condition. The predetermined condition is the condition satisfied when the difference between the first intake pipe pressure, which is the current pressure in the intake pipe estimated using the throttle-passing air flow that denotes the flow rate of the air passing through the throttle valve per unit time at the current throttle position, and the second intake pipe pressure, which is the pressure in the intake pipe when the throttle-passing air flow is equal to the in-cylinder intake air flow that denotes the flow rate of the air flowing into the combustion chamber per unit time, becomes equal to or less than the predetermined value. Using this predetermined condition further shortens a time duration between starting of the engine and permission for the reduction correction. When the difference becomes equal to or less than the predetermined value, it is expected that the actual pressure of the intake pipe is stable to some extent, so that permission is given for the reduction correction. Further shortening the time duration between starting of the engine and permission for the reduction correction suppresses the air-fuel ratio from being shifted to the rich side, for example, in the case where a required output of the engine is reduced in a relatively short time period after starting of the engine. As a result, this suppresses increase of the uncombusted fuel and suppresses deterioration of emission. The "base amount of fuel injection" herein may be an injection amount for start-time injection (amount of fuel injection to make the air-fuel ratio lower than a target air-fuel ratio) or an amount of fuel injection to make the air-fuel ratio approach the target air-fuel ratio.

DESCRIPTION OF EMBODIMENTS

The following describes some aspects of the invention with reference to embodiments.

Figure 1:
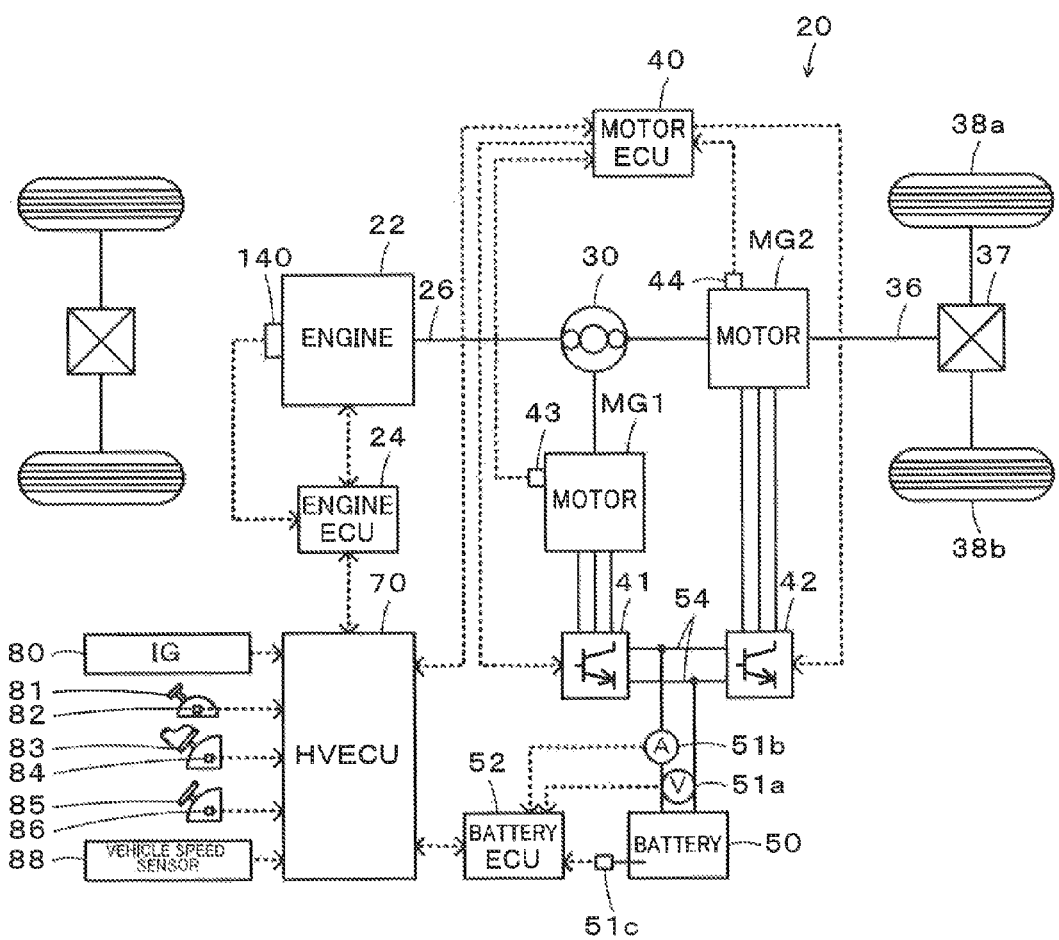
FIG. 1 is a configuration diagram illustrating the schematic configuration of a hybrid vehicle according to one embodiment of the invention.

FIG. 1 is a configuration diagram illustrating the schematic configuration of a hybrid vehicle 20 according to one embodiment of the invention. As illustrated, the hybrid vehicle 20 includes an engine 22, a planetary gear 30, motors MG1 and MG2, inverters 41 and 42, a battery 50, and a hybrid electronic control unit (hereinafter referred to as HVECU) 70.

Figure 2:
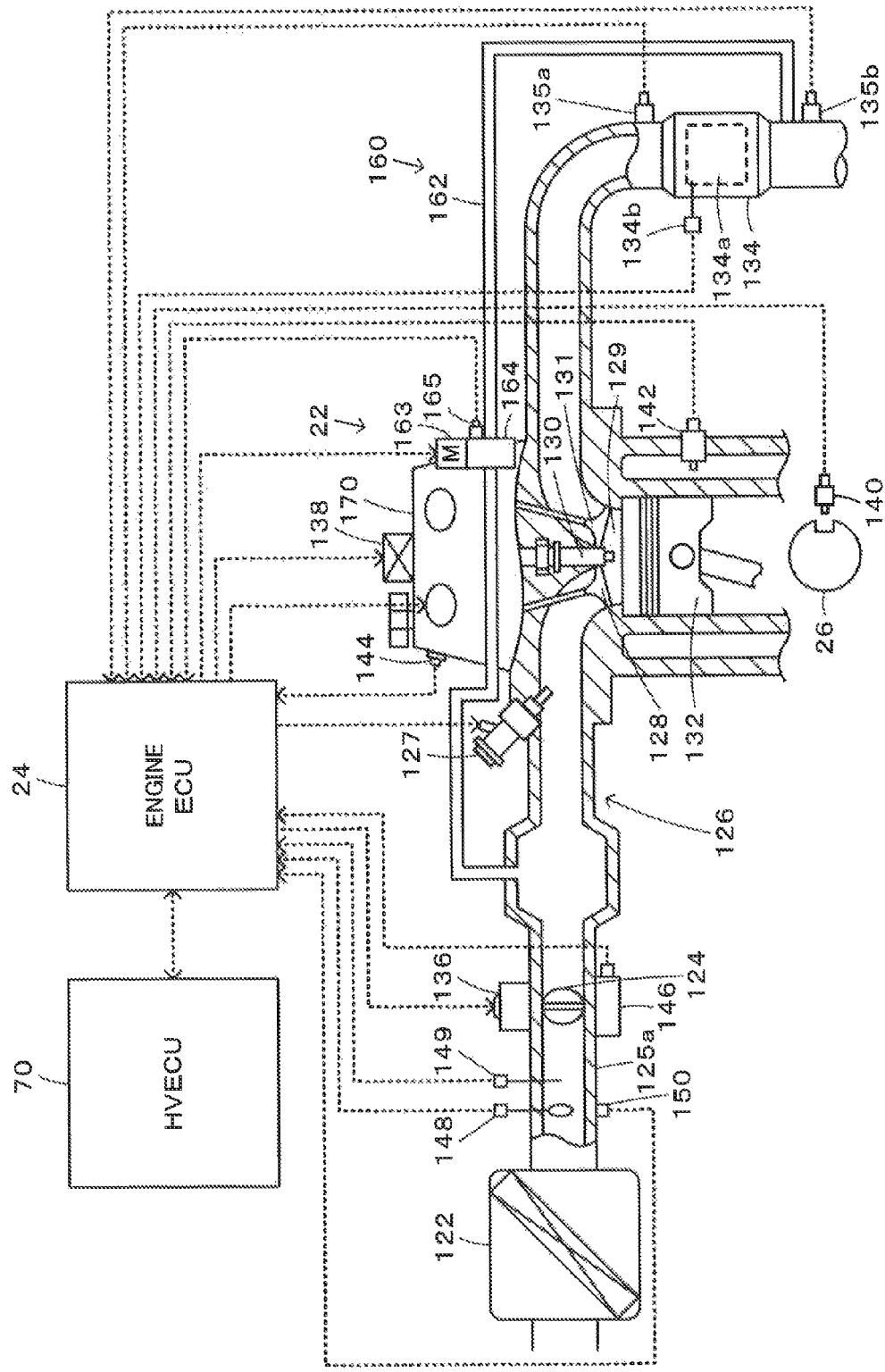
FIG. 2 is a configuration diagram illustrating the schematic configuration of an engine.

The engine 22 is configured as a four-cylinder internal combustion engine that outputs power in four strokes, i.e., intake, compression, expansion and exhaust, using, for example, gasoline or light oil as fuel. FIG. 2 is a configuration diagram illustrating the schematic configuration of the engine 22. As illustrated, the engine 22 has a fuel injection valve 127 that is provided to inject the fuel into an intake pipe 125a. The engine 22 mixes the intake air cleaned by an air cleaner 122 and taken into the intake pipe 125a via a throttle valve 124 with the fuel injected from the fuel injection valve 127 into the intake pipe 125a. The air-fuel mixture is drawn into a combustion chamber 129 via an intake valve 128. The drawn air-fuel mixture is explosively combusted with electric spark generated by a spark plug 130. The engine 22 converts the reciprocating motion of a piston 132 pressed down by the energy of explosive combustion into the rotational motion of a crankshaft 26. The exhaust gas from the combustion chamber 129 is discharged to the outside air through a catalytic converter 134 that is filled with a conversion catalyst (three-way catalyst) 134a to convert toxic components such as carbon monoxide (CO), hydrocarbons (HC) and nitrogen oxides (NOx) to less toxic components. The exhaust gas from the combustion chamber 129 is not fully discharged to the outside air but is partly supplied to the air intake system via an exhaust gas recirculation system (hereinafter referred to as EGR system) 160 that recirculates the exhaust gas to the intake air. The EGR system 160 includes an EGR pipe 162 and an EGR valve 164. The EGR pipe 162 is connected downstream of the catalytic converter 134 and is used to supply the exhaust gas to a surge tank of the air intake system. The EGR valve 164 is located in the EGR pipe 162 and is driven by a stepping motor 163. The EGR system 160 regulates the recirculation amount of the exhaust gas as uncombusted gas by adjusting the opening position of the EGR valve 164 and recirculates the regulated amount of the exhaust gas to the air intake system. The engine 22 is configured to draw the mixture of the air, the exhaust gas and the fuel into the combustion chamber 129.

The engine 22 is operated and controlled by an engine electronic control unit (hereinafter referred to as "engine ECU") 24. The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals required for operation control of the engine 22 from various sensors. The signals from various sensors include, for example, a crank angle θcr from a crank position sensor 140 configured to detect the rotational position of the crankshaft 26, a cooling water temperature Tw from a water temperature sensor 142 configured to detect the temperature of cooling water of the engine 22, cam angles θci and θco from a cam position sensor 144 configured to detect the rotational position of an intake cam shaft that opens and closes the intake valve 128 and the rotational position of an exhaust cam shaft that opens and closes an exhaust valve 131, a throttle position θt from a throttle position sensor 146 configured to detect the opening position of the throttle valve 124, an amount of intake air Qa from an air flowmeter 148 mounted to the intake pipe 125a, an intake air temperature (ambient temperature) Ta from a temperature sensor 149 mounted to the intake pipe 125a, an atmospheric pressure Pa from an atmospheric pressure sensor 150 configured to detect the atmospheric pressure, a conversion catalyst temperature Tc from a temperature sensor 134b configured to detect the temperature of the conversion catalyst 134a of the catalytic converter 134, an air-fuel ratio AF from an air-fuel ratio sensor 135a, an oxygen signal $O_2$ from an oxygen sensor 135*b*, a knocking signal Ks from a knocking sensor mounted to a cylinder block to detect a vibration induced by the occurrence of knocking, and an EGR valve position from an EGR valve position sensor 165 configured to detect the opening position of the EGR valve 164. The engine ECU 24 outputs, via its output port, various control signals for operation control of the engine 22. The various control signals include, for example, a control signal to a throttle motor 136 configured to adjust the position of the throttle valve 124, a control signal to the fuel injection valve 127, a control signal to an ignition coil 138 integrated with an igniter, a control signal to a variable valve timing mechanism 170 configured to vary the open-close timing of the intake valve 128 and a control signal to a stepping motor 163 configured to adjust the opening position of the EGR valve 164. The engine ECU 24 is connected with the HVECU 70 via the respective communication ports. The engine ECU 24 performs operation control of the engine 22 in response to control signals from the HVECU 70. The engine ECU 24 also outputs data regarding the operating conditions of the engine 22 to the HVECU 70 as appropriate. The engine ECU 24 computes the rotation speed of the crankshaft 26 or, in other words, a rotation speed Ne of the engine 22, based on the crank angle $\theta cr$ from the crank position sensor 140. The engine ECU 24 also computes an open-close timing VT of the intake valve 128, based on an angle ($\theta ci - \theta cr$) that indicates the cam angle $\theta ci$ of the intake cam shaft from the cam position sensor 144 relative to the crank angle $\theta cr$ from the crank position sensor 140. The engine ECU 24 further computes a volume efficiency (ratio of the volume of the air actually taken in one cycle to the stroke volume per cycle of the engine 22) KL as a load of the engine 22, based on the amount of intake air Qa from the air flowmeter 148 and the rotation speed Ne of the engine 22.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 38*a* and 38*b* via a differential gear 37 and is connected with a rotor of the motor MG2. The planetary gear 30 also includes a carrier that is connected with the crankshaft 26 of the engine 22.

The motor MG1 is configured, for example, as a synchronous motor generator. The motor MG1 includes the rotor that is connected with the sun gear of the planetary gear 30 as described above. The motor MG2 is also configured, for example, as a synchronous motor generator. The motor MG2 includes the rotor that is connected with the driveshaft 36 as described above. The battery 50 as well as the inverters 41 and 42 are connected with power lines 54. The motors MG1 and MG2 are rotated and driven by switching control of switching elements (not shown) of the inverters 41 and 42 by a motor electronic control unit (hereinafter referred to as "motor ECU") 40.

The motor ECU 40 is implemented by a CPU-based microprocessor and includes a ROM that stores processing programs, a RAM that temporarily stores data, input and output ports and a communication port other than the CPU, although not being illustrated. The motor ECU 40 inputs, via its input port, signals required for drive control of the motors MG1 and MG2 from various sensors. The signals from various sensors include, for example, rotational positions $\theta m1$ and $\theta m2$ from rotational position detection sensors 43 and 44 configured to detect the rotational positions of the rotors of the motors MG1 and MG2 and phase currents from current sensors configured to detect electric currents flowing through the respective phases of the motors MG1 and MG2. The motor ECU 40 outputs, via its output port, for example, switching control signals to the switching elements (not shown) of the inverters 41 and 42. The motor ECU 40 is connected with the HVECU 70 via the respective communication ports. The motor ECU 40 performs drive control of the motors MG1 and MG2 in response to control signals from the HVECU 70. The motor ECU 40 also outputs data regarding the operating conditions of the motors MG1 and MG2 to the HVECU 70 as appropriate. The motor ECU 40 computes rotation speeds Nm1 and Nm2 of the motors MG1 and MG2, based on the rotational positions $\theta m1$ and $\theta m2$ of the rotors of the motors MG1 and MG2 from the rotational position detection sensors 43 and 44.

The battery 50 is configured, for example, as a lithium ion secondary battery or a nickel hydride secondary battery and is connected with the inverters 41 and 42 by the power lines 54. This battery 50 is under management of a battery electronic control unit (hereinafter referred to as "battery ECU") 52.

The battery ECU 52 is implemented by a CPU-based microprocessor and includes a ROM that stores processing programs, a RAM that temporarily stores data, input and output ports and a communication port other than the CPU, although not being illustrated. The battery ECU 52 inputs, via its input port, signals required for management of the battery 50 from various sensors. The signals from various sensor include, for example, a battery voltage Vb from a voltage sensor 51*a* placed between terminals of the battery 50, a battery current Ib from a current sensor 51*b* mounted to an output terminal of the battery 50, and a battery temperature Tb from a temperature sensor 51*c* mounted to the battery 50. The battery ECU 52 is connected with the HVECU 70 via the respective communication ports. The battery ECU 52 outputs data regarding the conditions of the battery 50 to the HVECU 70 as appropriate. The battery ECU 52 computes a state of charge SOC, based on an integrated value of the battery current Ib from the current sensor 51*b*. The state of charge SOC denotes a ratio of power capacity dischargeable from the battery 50 to the entire capacity of the battery 50. The battery ECU 52 also computes input and output limits Win and Wout, based on the computed state of charge SOC and the battery temperature Tb from the temperature sensor 51*c*. The input and output limits Win and Wout denote maximum allowable electric powers chargeable into and dischargeable from the battery 50.

The HVECU 70 is implemented by a CPU-based microprocessor and includes a ROM that stores processing programs, a RAM that temporarily stores data, input and output ports and a communication port other than the CPU, although not being illustrated. The HVECU 70 inputs, via its input port, signals from various sensors. The signals from various sensors include, for example, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85, and a vehicle speed V from a vehicle speed sensor 88. As described above, the HVECU 70 is connected with the engine ECU 24, the motor ECU 40 and the battery ECU 52 via the communication ports. The HVECU 70 transmits various control signals and data to and from the engine ECU 24, the motor ECU 40 and the battery ECU 52.

The hybrid vehicle 20 of the embodiment having the above configuration runs in a selected drive mode, such as hybrid drive mode (HV drive mode) or an electric drive mode (EV drive mode). The HV drive mode denotes a drive mode in which the hybrid vehicle 20 is driven with operation of the engine 22. The EV drive mode denotes a drive mode in which the hybrid vehicle 20 is driven with stopping operation of the engine 22.

In the HV drive mode, the HVECU 70 first sets a required torque Tr* required for running (to be output to the driveshaft 36), based on the accelerator position Acc from the accelerator pedal position sensor 84 and the vehicle speed V from the vehicle speed sensor 88. The HVECU 70 subsequently multiplies the required torque Tr* by a rotation speed Nr of the driveshaft 36 to calculate a driving power Pdrv* required for running. The rotation speed Nr of the driveshaft 36 used herein may be the rotation speed Nm2 of the motor MG2 or a rotation speed calculated by multiplying the vehicle speed V by a conversion efficiency. The HVECU 70 subtracts a charge-discharge power demand Pb* of the battery 50 (that takes a positive value in the case of discharging from the battery 50) from the driving power Pdrv* to calculate a vehicle power Pv* required for the vehicle. The vehicle power Pv* is set to a required power Pe* of the engine 22. The HVECU 70 subsequently sets a target rotation speed Ne* and a target torque Te* of the engine 22 using the required power Pe* of the engine 22 and an operation line (for example, a fuel consumption optimizing operation line). According to this embodiment, a rotation speed Neef and a torque Teef at an intersection of an equal-power line of the required power Pe* with the operation line are respectively set to the target rotation speed Ne* and the target torque Te*. The HVECU 70 sets torque commands Tm1* and Tm2* of the motors MG1 and MG2 in the range of the input limit Win and the output limit Wout of the battery 50. The torque command Tm1* of the motor MG1 is set by rotation speed feedback control that aims to make the rotation speed Ne of the engine 22 approach the target rotation speed Ne*. The torque command Tm2* of the motor MG2 is set by subtracting a torque (−Tm1*/ρ) from the required torque Tr*. The torque (−Tm1*/ρ) denotes a torque that is output from the motor MG1 and is applied to the driveshaft 36 via the planetary gear 30 when the motor MG1 is driven with the torque command Tm1*. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs intake air flow control, fuel injection control, ignition control and open-close timing control of the engine 22 so as to operate the engine 22 based on the received target rotation speed Ne* and the received target torque Te*. The intake air flow control is performed by drive control of the throttle motor 136. The fuel injection control is performed by drive control of the fuel injection valve 127. The ignition controls is performed by drive control of the ignition coil 138. The open-close timing control is performed by drive control of the variable valve timing mechanism 170. When receiving the torque commands Tm1* and Tm2* of the motors MG1 and MG2, the motor ECU 40 performs switching control of the switching elements of the inverters 41 and 42 so as to drive the motors MG1 and MG2 with the torque commands Tm1* and Tm2*.

When the vehicle power Pv* decreases below a reference value Pref in the HV drive mode, it is determined that a stop condition of the engine 22 is satisfied, and a process of stopping the engine 22 is performed to make a shift to the EV drive mode. The process of stopping the engine 22 stops the fuel injection control of the engine 22 and causes the motor MG1 to motor the engine 22 with a view to decreasing the rotation speed Ne of the engine 22.

According to this embodiment, the following control is performed when the stop condition of the engine 22 is satisfied in the state that the open-close timing VT of the intake valve 128 is at an advanced position (position according to the target torque Te* or the like) from a starting position suitable for starting the engine 22 (for example, most retarded position). The control procedure controls the variable valve timing mechanism 150 to shift the open-close timing VT to the starting position, while setting the target torque Te* of the engine 22 to value 0 to idle the engine 22. The control procedure performs the process of stopping the engine 22 when the open-close timing VT is shifted to the starting position. This aims to improve the startability of the engine 22 for a next restart.

According to this embodiment, the following control is performed when the stop condition of the engine 22 is satisfied before a predetermined reference time tref (for example, 3 seconds or 5 seconds) has elapsed since completion of starting the engine 22 (complete explosion). The control procedure sets the target torque Te* of the engine 22 to value 0 to idle the engine 22 until elapse of the predetermined reference time tref since completion of starting the engine 22, whether the open-close timing VT of the intake valve 128 is at the starting position or not. The control procedure performs the process of stopping the engine 22 when the predetermined reference time tref has elapsed since completion of starting the engine 22. This aims to avoid the operation of the engine 22 for a very short time period. Completion of starting the engine 22 (complete explosion) may be determined, for example, based on a variation in rotation speed Ne of the engine 22.

In the EV drive mode, the HVECU 70 first sets the required torque Tr*, as in the case of the HV drive mode. The HVECU 700 subsequently sets the torque command Tm1* of the motor MG1 to value 0. The HVECU 70 sets the torque command Tm2* of the motor MG2 such as to output the required torque Tr* to the driveshaft 36 in the range of the input limit Win and the output limit Wout of the battery 50. The HVECU 70 then sends the torque commands Tm1* and Tm2* of the motors MG1 and MG2 to the motor ECU 40. When receiving the torque commands Tm1* and Tm2* of the motors MG1 and MG2, the motor ECU 40 performs switching control of the switching elements of the inverters 41 and 42 so as to drive the motors MG1 and MG2 with the torque commands Tm1* and Tm2*.

When the vehicle power Pv* computed in the same manner as in the HV drive mode increases to or above the reference value Pref in the EV drive mode, it is determined that a starting condition of the engine 22 is satisfied, and a process of starting the engine 22 is performed to make a shift to the HV drive mode. The process of starting the engine 22 causes the motor MG1 to motor the engine 22 with a view to increasing the rotation speed Ne of the engine 22. When the rotation speed Ne of the engine 22 becomes equal to or higher than a predetermined rotation speed Nst (for example, 500 rpm, 600 rpm or 700 rpm), the fuel injection control and the ignition control are started. The process of starting the engine 22 gradually increases the target torque Te* from value 0 to a torque Teef (i.e., torque set by using the operation line and the required power Pe* in the same manner as in the HV drive mode).

Figure 3:
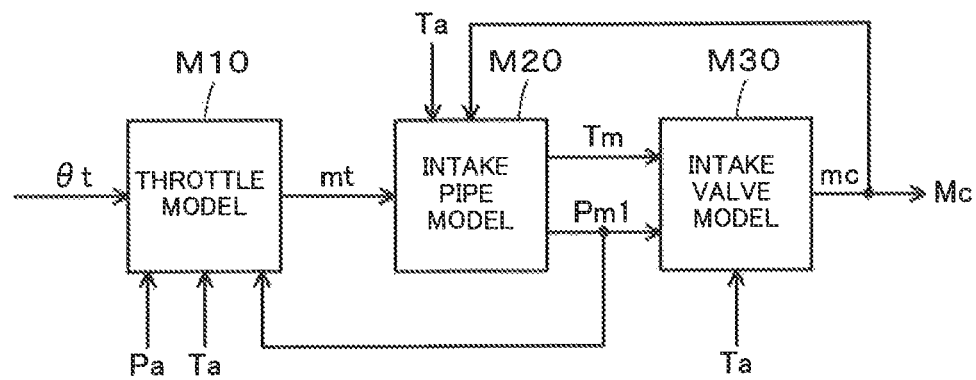
FIG. 3 is a diagram illustrating one example of air model.

In the hybrid vehicle 20 of the embodiment, the engine ECU 24 uses an air model shown in FIG. 3 to compute (estimate) a throttle-passing air flow mt, a first intake pipe pressure Pm1, a second intake pipe pressure Pm2, an intake pipe temperature Tm, an in-cylinder intake air flow me and a cylinder-filled air amount Mc. The throttle-passing air flow mt denotes a flow rate of the air passing through the throttle valve 124 per unit time. The first intake pipe pressure Pm1 denotes a pressure of the air in a specified portion 126. The specified portion 126 is a portion of the intake pipe 125a between the throttle valve 124 and the intake valve 128. The second intake pipe pressure Pm2 denotes a pressure of the air in the specified portion 126 during steady operation of the engine 22 at the current throttle position θt. The intake pipe temperature Tm denotes a temperature of the air in the specified portion 126. The in-cylinder intake air flow me denotes a flow rate of the air flowing into the combustion chamber 129 per unit time. The cylinder-filled air amount Mc denotes an amount of the air filled in the combustion chamber 129 when the intake valve 128 is closed.

The air model shown in FIG. 3 includes a throttle model M10, an intake pipe model M20 and an intake valve model M30. Data input into the throttle model M10 include the throttle position θt detected by the throttle position sensor 146, the atmospheric pressure Pa detected by the atmospheric pressure sensor 150, the intake air temperature (ambient temperature) Ta detected by the temperature sensor 149 and the first intake pipe pressure Pm1 computed by the intake pipe model M20. The throttle model M10 substitutes the input parameters into a model formula of the throttle model M10 to compute the throttle-passing air flow mt. The computed throttle-passing air flow mt is output to the intake pipe model M20.

Data input into the intake pipe model M20 include the throttle-passing air flow mt computed by the throttle model M10, the intake air temperature ta from the temperature sensor 149 and the in-cylinder intake air flow me computed by the intake valve model M30. The intake pipe model M20 substitutes the input parameters into a model formula of the intake pipe model M20 to compute the first intake pipe pressure Pm1 and the intake pipe temperature Tm. The computed first intake pipe pressure Pm1 and the computed intake pipe temperature Tm are output to the intake valve model M30. The first intake pipe pressure Pm1 is also output to the throttle model M10.

Data input into the intake valve model M30 include the first intake pipe pressure Pm1 and the intake pipe temperature Tm computed by the intake pipe model M20 and the intake air temperature Ta from the temperature sensor 149. The intake valve model M30 substitutes the input parameters into a model formula of the intake valve model M30 to compute the in-cylinder intake air flow mc. The intake valve model M30 also converts the computed in-cylinder intake air flow me into the cylinder-filled air amount Mc and outputs the cylinder-filled air amount Mc. The in-cylinder intake air flow me is output to the intake pipe model M20.

As understood from FIG. 3, in the air model, data computed by one model out of the throttle model M10, the intake pipe model M20 and the intake valve model M30 is used as the input value of another model. Accordingly, the actual inputs into the air model as a whole are only the three parameters, i.e., the throttle position θt, the atmospheric pressure Pa and the intake air temperature Ta. In other words, the air model uses these three parameters to compute (estimate) the throttle-passing air flow mt, the first intake pipe pressure Pm1, the intake pipe temperature Tm, the in-cylinder intake air flow me and the cylinder-filled air amount Mc.

The following sequentially describes the details of the throttle model M10, the intake pipe model M20 and the intake valve model M30.

The details of the throttle model M10 are described first. The throttle model M10 computes the throttle-passing air flow mt from the throttle position θt, the atmospheric pressure Pa, the intake air temperature Ta and the first intake pipe pressure Pm1 according to Equation (1) given below.

[Math. 1]
$$mt = \mu(\theta t) \cdot A(\theta t) \cdot \frac{Pa}{\sqrt{R \cdot Ta}} \cdot \Phi\left(\frac{Pm1}{Pa}\right) \tag{1}$$

Figure 4:
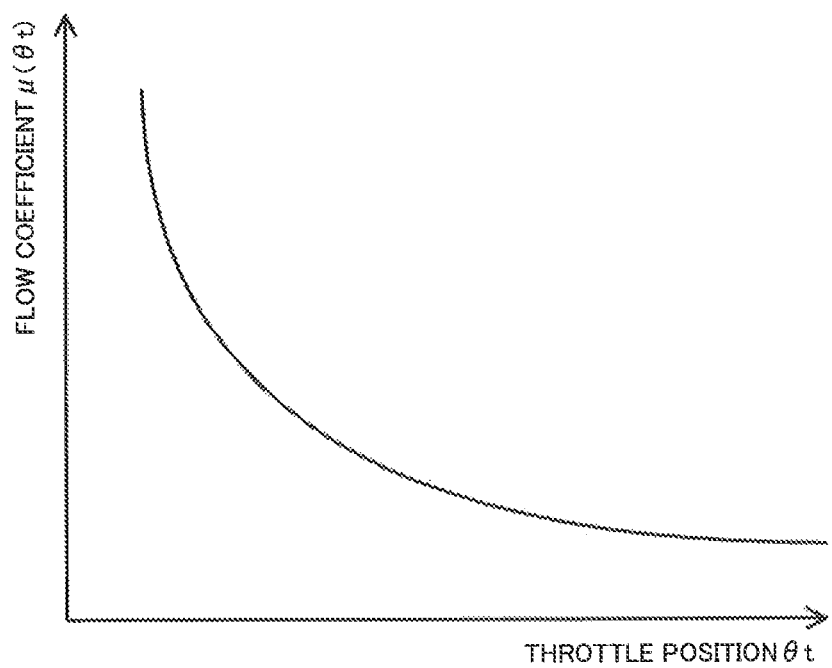
FIG. 4 is a diagram illustrating one example of relationship between throttle position θt and flow coefficient μ(θt)
Figure 5:
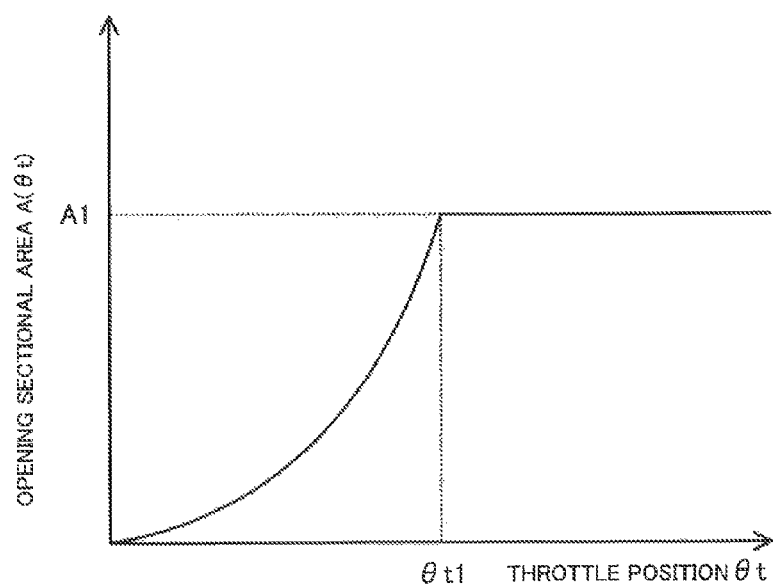
FIG. 5 is a diagram illustrating one example of relationship between throttle position θt and opening sectional area A(θt)
Figure 6:
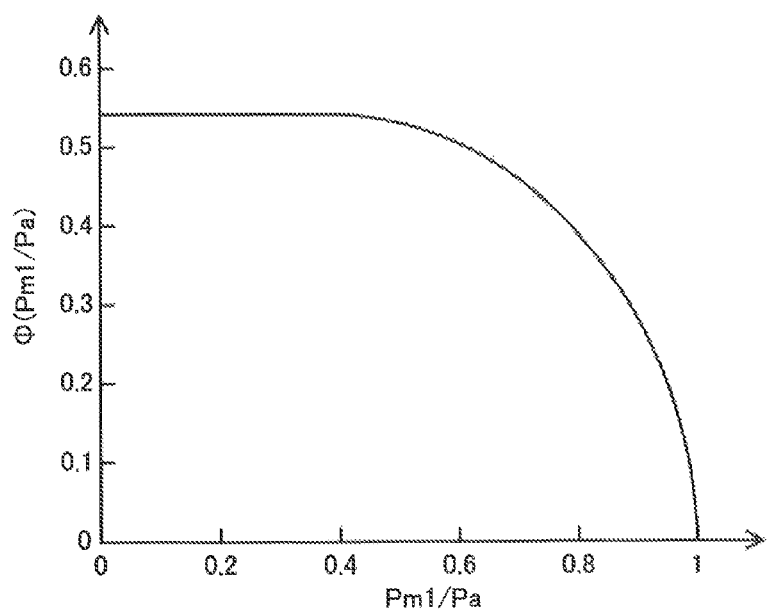
FIG. 6 is a diagram illustrating one example of relationship between (Pm1/Pa) and Φ(Pm1/Pa)

In Equation (1), "μ(θt)" represents a flow coefficient of the throttle valve 124. With regard to the flow coefficient μ(θt), according to this embodiment, a relationship between the throttle position θt and the flow coefficient μ(θt) is specified in advance by experiment or by analysis and is stored in the form of a map in the ROM (not shown). A flow coefficient μ(θt) corresponding to a given throttle position et is read from this map to be estimated. An example of the relationship between the throttle position θt and the flow coefficient μ(θt) is shown in FIG. 4. As illustrated, the flow coefficient μ(θt) is set to decrease with an increase in throttle position St. In Equation (1), "A(θt)" represents an opening sectional area of the throttle valve 124. With regard to the opening section area A (θt), according to this embodiment, a relationship between the throttle position θt and the opening sectional area A(θt) is specified in advance by experiment or by analysis and is stored in the form of a map in the ROM (not shown). An opening sectional area A(θt) corresponding to a given throttle position θt is read from this map to be estimated. An example of the relationship between the throttle position θt and the opening sectional area A(θt) is shown in FIG. 5. As illustrated, the opening sectional area A(θt) is set to increase to a predetermined value A1 with an increase in throttle position θt in a range that the throttle position θt is less than a predefined value δt1 and to be fixed to the predetermined value A1 in a range that the throttle position θt is equal to or greater than the predefined value θt1. A value μ(θt)·A(θt) as the product of the flow coefficient μ(θt) and the opening sectional area A(θt) may be determined by using one map based on the throttle position θt. In Equation (1), "R" represents a constant relating to the gas constant. This constant R is equivalent to a value obtained by dividing the gas constant by a mass M1 of 1 mol of the gas (air). In Equation (1), "Φ(Pm1/Pa)" represents a function obtained by Equation (2) given below. In Equation (2), "κ" represents a ratio of specific heat. The ratio of specific heat is assumed to be a constant value. This function Φ(Pm1/Pa) may be expressed in the form of a map as shown in FIG. 6. Accordingly, the value of the function Φ(Pm1/Pa) may be determined by applying the first intake pipe pressure Pm1 and the atmospheric pressure Pa to the map of FIG. 6, instead of using Equation (2).

[Mat. 2]

$$\Phi\left(\frac{Pm1}{Pa}\right) = \quad (2)$$

$$\begin{cases} \sqrt{\frac{\kappa}{2(\kappa+1)}} & \left(\text{When } \frac{Pm1}{Pa} \leq \frac{1}{\kappa+1}\right) \\ \sqrt{\left\{\left(\frac{\kappa-1}{2\kappa}\right)\cdot\left(1-\frac{Pm}{Pa}\right)+\frac{Pm}{Pa}\right\}\cdot\left(1-\frac{Pm}{Pa}\right)} & \left(\text{When } \frac{Pm1}{Pa} > \frac{1}{\kappa+1}\right) \end{cases}$$

Figure 7:
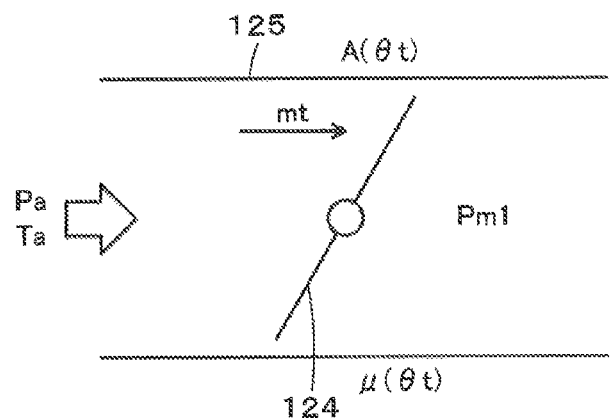
FIG. 7 is a diagram illustrating a throttle model M10.

FIG. 7 is a diagram illustrating the throttle model M10. Equation (1) and Equation (2) given above are obtained by the following procedure. The pressure of the gas upstream of the throttle valve 124 is specified as the atmospheric pressure Pa. The temperature of the gas upstream of the throttle valve 124 is specified as the intake air temperature Ta. The pressure of the gas downstream of the throttle valve 124 is specified as the first intake pipe pressure Pm1. The procedure applies the law of conservation of mass, the law of conservation of energy and the law of conservation of momentum to the throttle model M10 of FIG. 7, and additionally uses the gas equation, the equation of the ratio of specific heat and the Mayer's relation.

The details of the intake pipe model M20 are described below. The intake pipe model M20 computes the first intake pipe pressure Pm1 and the intake pipe temperature Tm from the throttle-passing air flow mt, the intake air temperature Ta, the in-cylinder intake air flow mc, the constant R and the ratio of specific heat κ according to Equations (3) and (4) given below. In Equations (3) and (4), "Vm" represents a constant that is equal to the volume of the specified portion 126.

[Math. 3]

$$\frac{d}{dt}\left(\frac{Pm1}{Tm}\right) = \frac{R}{Vm} \cdot (mt - mc) \quad (3)$$

$$\frac{dPm1}{dt} = \kappa \cdot \frac{R}{Vm} \cdot (mt \cdot Ta - mc \cdot Tm) \quad (4)$$

Figure 8:
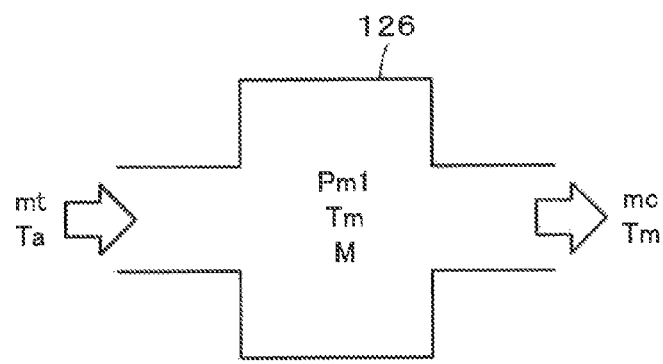
FIG. 8 is a diagram illustrating an intake pipe model M20.

FIG. 8 is a diagram illustrating the intake pipe model M20. As understood from FIG. 8, when the total gas amount (total amount of the air) in the specified portion 126 is expressed by M, a time variation of the total gas amount M is equal to the difference between the flow rate of the gas flowing into the specified portion 126, i.e., the throttle-passing air flow mt and the flow rate of the gas flowing out of the specified portion 126, i.e., the in-cylinder intake air flow mc. Equation (5) given below is thus led from the law of conservation of mass. Equation (3) is obtained from Equation (5) and the gas equation (Pm1·Vm=M·R·Tm) in the specified portion 126.

[Math. 4]

$$\frac{dM}{dt} = mt - mc \quad (5)$$

A time variation of energy M·Cv·Tm of the gas in the specified portion 126 is equal to the difference between the energy of the gas flowing into the specified portion 126 and the energy of the gas flowing out of the specified portion 126. On the assumption that the temperature of the gas flowing into the specified portion 126 is equal to the intake air temperature Ta and the temperature of the gas flowing out of the specified portion 126 is equal to the intake pipe temperature Tm, Equation (6) given below is led from the law of conservation of energy. In Equation (6), "Cp" represents a specific heat at constant pressure of the air, and "Cv" represents a specific heat at constant volume of the air. Equation (4) is obtained from Equation (6) and the gas equation described above.

[Math. 5]

$$\frac{d(M \cdot Cv \cdot Tm)}{dt} = Cp \cdot mt \cdot Ta - Cp \cdot mc \cdot Tm \quad (6)$$

The details of the intake valve model M30 are described below. The intake valve model M30 computes the in-cylinder intake air flow mc from the first intake pipe pressure Pm1, the intake pipe temperature Tm and the intake air temperature Ta according to Equation (7) given below. In Equation (7), "a" and "b" are values determined according to the rotation speed Ne of the engine 22 and the open-close timing VT of the variable valve timing mechanism 170.

[Math. 6]

$$mc = \frac{Ta}{Tm} \cdot (a \cdot Pm1 - b) \quad (7)$$

Figure 9:
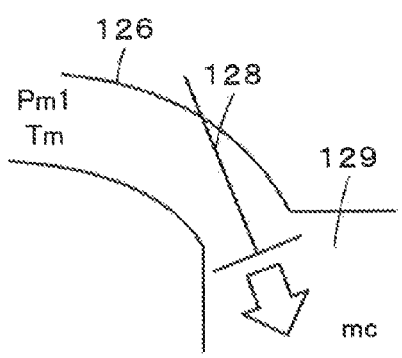
FIG. 9 is a diagram illustrating an intake valve model M30.

FIG. 9 is a diagram illustrating the intake valve model M30. In general, the cylinder-filled air amount Mc (amount of the air filled in the combustion chamber 129 when the intake valve 128 is closed) is settled when the intake valve 128 is closed and is proportional to the internal pressure of the combustion chamber 129 at the valve closing time of the intake valve 128. The pressure of the combustion chamber 129 at the valve closing time of the intake valve 128 may be assumed to be equal to the pressure of the gas upstream of the intake valve 128, i.e., the first intake pipe pressure Pm1. The cylinder-filled air amount Mc may thus be approximated to be proportional to the first intake pipe pressure Pm1.

When the average of the total amount of the air flowing out of the specified portion 126 per fixed time (for example, corresponding to 720 degrees of the crank angle θcr) or the division of the amount of the air drawn from the specified portion 126 into the combustion chambers 129 of all the cylinders per fixed time (for example, corresponding to 720 degrees of the crank angle θcr) by the fixed time is set to the in-cylinder intake air flow mc, the cylinder-filled air amount Mc is proportional to the first intake pipe pressure Pm1. It is thus estimated that the in-cylinder intake air flow me is also proportional to the first intake pipe pressure Pm1. Equation (7) given above is thus obtained theoretically and empirically. In Equation (7), "a" is a proportionality factor, and "b" is a compatible value representing the burnt gas remaining in the combustion chamber 129. The compatible value is obtained by dividing the amount of the burnt gas remaining in the combustion chamber 129 at the valve closing time of the exhaust valve 131 by a time duration ΔT180° required for rotating the crankshaft 26 by 180 degrees. The value "180 degrees" herein means an angle (angle of one stroke) obtained by dividing the rotation angle, 720 degrees, of the crankshaft 26 in one cycle (four strokes, i.e., intake, compression, expansion and exhaust) by the number of cylinders, 4. In the actual operation of the engine 22, the intake pipe temperature Tm may be significantly changed. Equation (7) accordingly multiplies "a·Pm−b" by "Ta/Tm" led theoretically and empirically as correction taking into account a change in intake pipe temperature Tm.

Figure 10:
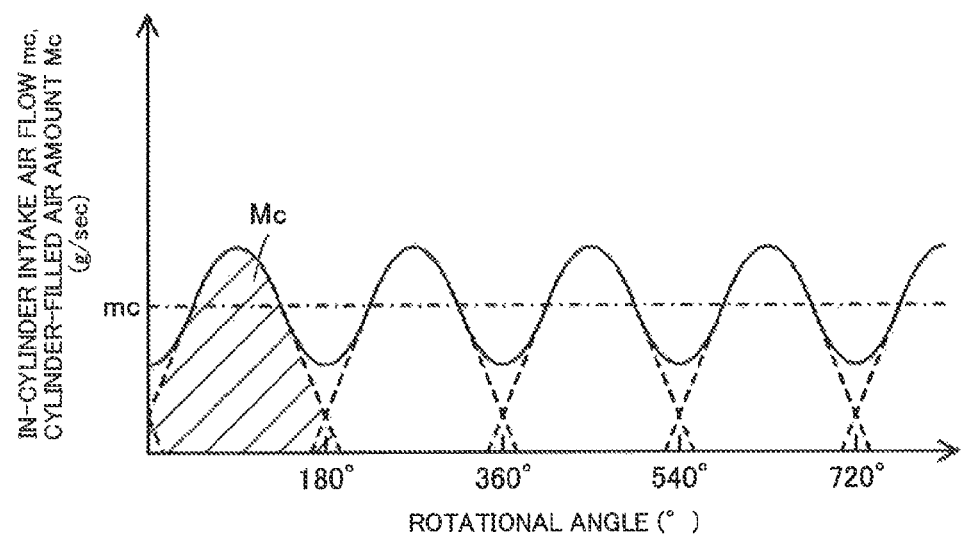
FIG. 10 is a graph showing an in-cylinder intake air flow me and a cylinder-filled air amount Mc.

FIG. 10 is a graph showing the in-cylinder intake air flow me and the cylinder-filled air amount Mc. FIG. 10 shows the rotational angle of the crankshaft 26 as abscissa and the flow rate of the air actually flowing from the specified portion 126 into the combustion chamber 129 per unit time as ordinate. The embodiment uses the four-cylinder engine 22, so that the intake valve 128 is opened, for example, in the sequence of the first cylinder, the third cylinder, the fourth cylinder and the second cylinder. As shown in FIG. 10, the air flows from the specified portion 126 into the combustion chamber 129 of each cylinder according to the valve-opening amount of the intake valve 128 corresponding to each cylinder. For example, the flow rate of the air flowing from the specified portion 126 into the combustion chamber 129 of each cylinder has a change shown by the broken line in FIG. 10. The flow rate of the air flowing from the specified portion 126 into the combustion chambers 129 of all the cylinders as integration of these changes is shown by the solid line in FIG. 10. The cylinder-filled air amount Mc in the first cylinder is shown as an area filled with slant lines in FIG. 10.

The in-cylinder intake air flow mc, on the other hand, denotes the average of the flow rate of the air flowing from the specified portion 126 into the combustion chambers 129 of all the cylinders shown by the solid line and is shown by the one-dot chain line in FIG. 10. The cylinder-filled air amount Mc is obtained by multiplying the in-cylinder intake air flow mc shown by the one-dot chain line by the time duration ΔT180°. The cylinder-filled air amount Mc is thus computed by multiplying the in-cylinder intake air flow mc computed by the intake valve model M30 by the time duration ΔT180°. More specifically, the cylinder-filled air amount Mc is obtained by multiplying the in-cylinder intake air flow me at the valve closing time of the intake valve 128 by the time duration ΔT180° by taking into account that the cylinder-filled air amount Mc is proportional to the pressure at the valve closing time of the intake valve 128.

The embodiment uses this air model to compute (estimate) the second intake pipe pressure Pm2, as well as the first intake pipe pressure Pm1. The second intake pipe pressure Pm2 denotes the pressure of the air in the specified portion 126 during steady operation of the engine 22 at the current throttle position θt as described above. The second intake pipe pressure Pm2 is computed by Equations (1) and (7) given above on the assumption that the throttle-passing air flow mt is equal to the in-cylinder intake air flow mc.

The following describes implementation of the above air model in the engine ECU 24 for actual computation of the cylinder-filled air amount Mc. The cylinder-filled air amount Mc is obtained by solving Equations (1), (3), (4) and (7) given above using the air model. It is required to discretize these equations to allow for the operations by the engine ECU 24. Equations (8), (9), (10) and (11) are obtained by discretizing Equations (1), (3), (4) and (7) using a time t and an operation interval Δt. An intake pipe temperature Tm(t+Δt) is computed by Equation (12) from Pm1/Tm·(t+Δt) and Pm1(t+Δt) that are respectively computed by Equations (9) and (10).

[Math. 7]

$$mt(t) = \mu(\theta(t)) \cdot A(\theta(t)) \cdot \frac{Pa}{\sqrt{R \cdot Ta}} \cdot \Phi\left(\frac{Pm1(t)}{Pa}\right) \quad (8)$$

$$\frac{Pm1}{Tm}(t + \Delta t) = \frac{Pm1}{Tm}(t) + \Delta t \cdot \frac{R}{Vm} \cdot (mt(t) - mc(t)) \quad (9)$$

[Math. 8]

$$Pm1(t + \Delta t) = Pm1(t) + \Delta t \cdot \kappa \cdot \frac{R}{Vm} \cdot (mt(t) \cdot Ta - mc(t) \cdot Tm(t)) \quad (10)$$

$$mc(t) = \frac{Ta}{Tm(t)}(a \cdot Pm1(t) - b) \quad (11)$$

[Math. 9]

$$Tm(t + \Delta t) = \frac{Pm1(t + \Delta t)}{\frac{Pm1}{Tm}(t + \Delta t)} \quad (12)$$

In the implemented air model, a throttle-passing air flow mt (t) at the time t computed by Equation (8) of the throttle model M10 and an in-cylinder intake air flow mc(t) at the time t computed by Equation (11) of the intake valve model M30 are substituted in Equations (9) and (10) of the intake pipe model M20. This computes a first intake pipe pressure Pm1(t+Δt) and an intake pipe temperature Tm(t+Δt) at a time t+Δt. The computed first intake pipe pressure Pm1(t+Δt) and intake pipe temperature Tm(t+Δt) are then substituted into Equation (8) of the throttle model M10 and Equation (11) of the intake valve model M30. This computes a throttle-passing air flow mt (t+Δt) and an in-cylinder intake air flow mc(t+Δt) at the time t+Δt. By repeating these operations, the in-cylinder intake air flow me at an arbitrary time t is computed from the throttle position θt, the atmospheric pressure Pa and the intake air temperature Ta. The cylinder-filled air amount Mc at an arbitrary time t is then computed by multiplying the computed in-cylinder intake air flow me by the time duration ΔT180°.

In the implemented air model, a second intake pipe pressure Pm2(t) at the time t is also computed by Equations (8) and (11).

At the start of the engine 22, i.e., at the time t=0, the operations of the throttle model M10, the intake pipe model M20 and the intake valve model 30 are started on the assumption that the first intake pipe pressure Pm1 is equal to the atmospheric pressure Pa (Pm1(0)=Pa) and that the intake pipe temperature Tm is equal to the intake air temperature Ta (Tm(0)=Ta).

In the above air model, the intake air temperature Ta and the atmospheric pressure Pa are fixed values irrespective of time (as shown by, for example, Equation (8)). The intake air temperature Ta and the atmospheric pressure Pa may, however, be values varying with time. For example, a value detected by the temperature sensor 149 and a value detected by the atmospheric pressure sensor 150 may be respectively set to an intake air temperature (atmospheric temperature) Ta(t) and an atmospheric pressure Pa(t) and substituted in Equations (8), (10) and (11) given above.

The following describes control of the engine 22 by the engine ECU 24 or more specifically intake air flow control and fuel injection control. The ignition control and the open-close timing control are not characteristic of the invention and are thus not specifically described herein.

In the intake air flow control, the engine ECU 24 first inputs data, for example, a target torque Te* of the engine 22. The input target torque Te* is a value set by a starting process in the HV drive mode described above. After the data input, the engine ECU 24 sets a target throttle position TH* based on the input target torque Te* and controls the throttle motor 136 to make the throttle position θt approach the target throttle position TH*.

Figure 11:
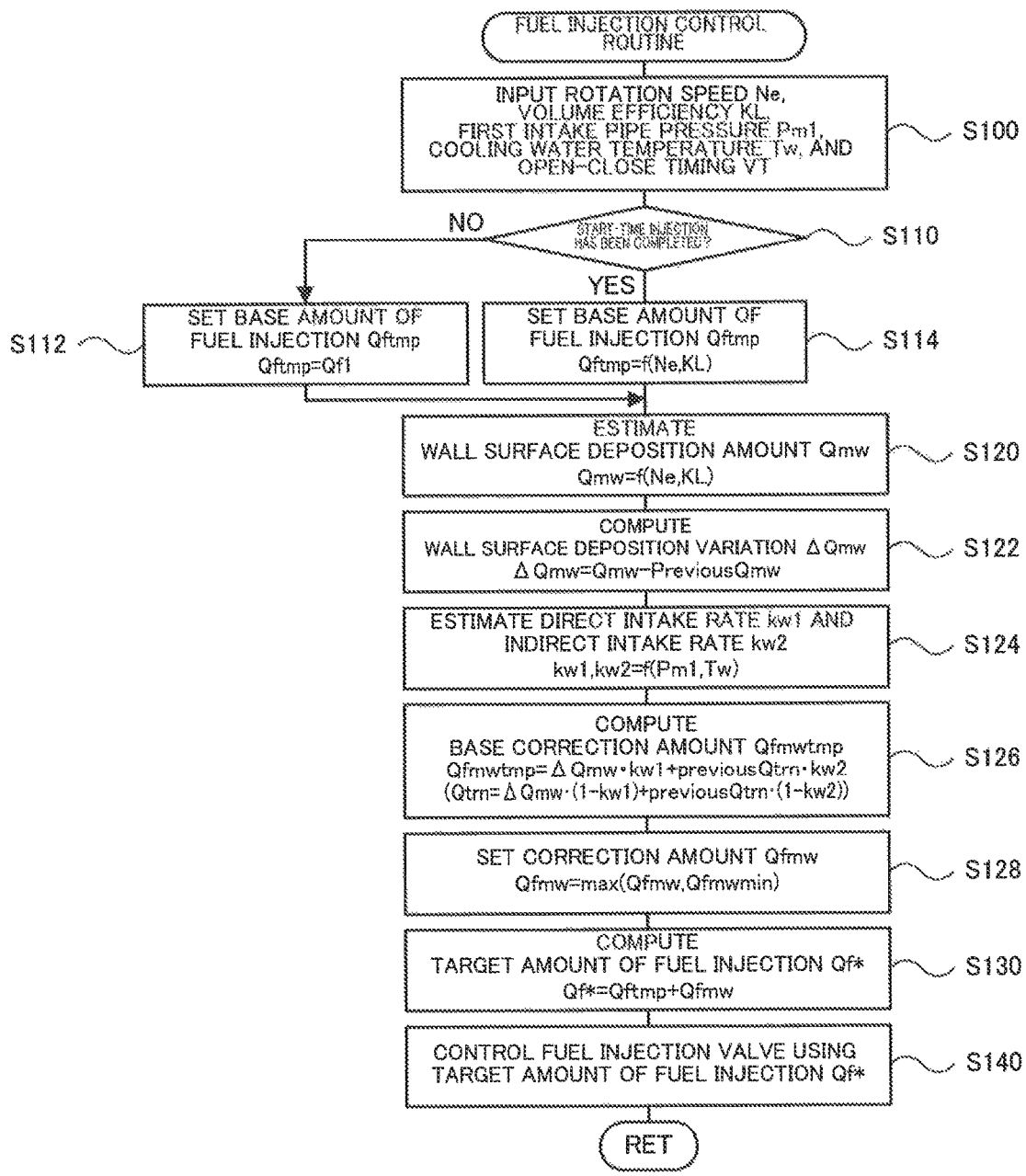
FIG. 11 is a flowchart showing an example of fuel injection control routine performed by an engine ECU according to the embodiment.

In the fuel injection control, the engine ECU 24 performs a fuel injection control routine shown in FIG. 11. This routine is performed repeatedly.

On the start of the fuel injection control routine, the engine ECU 24 first inputs data including the rotation speed Ne of the engine 22, the volume efficiency KL, the first intake pipe pressure Pm1, the cooling water temperature Tw and the open-close timing VT of the intake valve 128 (step S100). The input rotation speed Ne of the engine 22 is a value computed based on the crank angle θcr from the crank position sensor 140. The input volume efficiency KL is a value computed based on the amount of intake air Qa from the air flowmeter 148 and the rotation speed Ne of the engine 22. The input first intake pipe pressure Pm1 is a value computed by the intake pipe model M20 of the above air model. The input cooling water temperature Tw is a value detected by the water temperature sensor 142. The input open-close timing VT of the intake valve 128 is a value computed based on the angle (θci−θcr) that indicates the cam angle θci of the intake cam shaft from the cam position sensor 144 relative to the crank angle θcr from the crank position sensor 140.

After the data input, the engine ECU 24 determines whether start-time injection of the engine has been completed (step S110). When it is determined that the start-time injection of the engine 22 has not yet been completed, the engine ECU 24 sets a predetermined injection amount Qf1 to a base amount of fuel injection Qftmp (step S112). The predetermined injection amount Qf1 is a value set to make the air-fuel ratio slightly lower than a target air-fuel ratio such as stoichiometric air-fuel ratio (slightly shift to the rich side), in order to ensure the good startability of the engine 22. Fuel injection control using a target amount of fuel injection Qf* based on this base amount of fuel injection Qftmp(=Qf1) is called "start-time injection". The start-time injection is started when the rotation speed Ne of the engine 22 becomes equal to or higher than a predetermined rotation speed Net (i.e., when fuel injection control is to be started), while being completed after fuel injection in a predetermined number of cylinders (for example, 4, 8 or 12 cylinders, i.e., two rotations, four rotations or six rotations of the engine 22).

When it is determined at step S110 that the start-time injection of the engine 22 has been completed, the engine ECU 24 sets the base amount of fuel injection Qftmp, based on the rotation speed Ne of the engine 22 and the volume efficiency KL (step S114). The base amount of fuel injection Qftmp denotes an amount of fuel injection to make the air-fuel ratio of the engine 22 approach the target air-fuel ratio. According to this embodiment, a procedure of setting the base amount of fuel injection Qftmp specifies and stores in advance a relationship of the rotation speed Ne of the engine 22 and the volume efficiency KL to the base amount of fuel injection Qftmp in the form of a map and reads the base amount of fuel injection Qftmp corresponding to a given rotation speed Ne of the engine 22 and a given volume efficiency KL from the map. The base amount of fuel injection Qftmp is set to increase with an increase in rotation speed Ne of the engine 22 and to increase with an increase in volume efficiency KL.

The engine ECU 24 subsequently estimates a wall surface deposition amount Qmw based on the rotation speed Ne of the engine 22 and the volume efficiency KL (step S120). The wall surface deposition amount Qmw denotes an amount of fuel depositing on the wall surface of the intake pipe 125a during fuel injection control on the assumption that the operating state of the engine 22 is steady state. According to this embodiment, a procedure of estimating the wall surface deposition amount Qmw specifies in advance a relationship of the rotation speed Ne of the engine 22 and the volume efficiency KL to the wall surface deposition amount Qmw by experiment or by analysis, stores the specified relationship in the form of a map in the ROM (not shown) and reads the wall surface deposition amount Qmw corresponding to a given rotation speed Ne of the engine 22 and a given volume efficiency KL from the map. The wall surface deposition amount Qmw is basically set to increase with an increase in rotation speed Ne of the engine 22 and to increase with an increase in volume efficiency KL.

After estimating the wall surface deposition amount Qmw, the engine ECU 24 computes a wall surface deposition variation ΔQmw by subtracting a previous wall surface deposition amount (previous Qmw) from the estimated wall surface deposition amount Qmw according to Equation (13) given below (step S122). Since the wall surface deposition amount Qmw is estimated in the above tendency, the wall surface deposition variation ΔQmw basically takes positive values at the high rotation speed Ne of the engine 22 and the high volume efficiency KL and takes negative values at the low rotation speed Ne of the engine 22 and the low volume efficiency KL.

$$\Delta Qmw = Qmw - \text{previous } Qmw \quad (13)$$

The engine ECU 24 subsequently estimates a direct intake rate kw1 and an indirect intake rate kw2, based on the first intake pipe pressure Pm1 and the cooling water temperature Tw of the engine 22 (step S124). The direct intake rate kw1 denotes a ratio of the amount of fuel that does not deposit on the wall surface of the intake pipe 125a but is directly taken into the combustion chamber 129 to the amount of fuel injection from the fuel injection valve 127. The indirect intake rate kw2 denotes a ratio of the amount of fuel that is separated from the wall surface of the intake pipe 125a and is taken into the combustion chamber 129 to the amount of fuel depositing on the wall surface of the intake pipe 125a. According to this embodiment, a procedure of estimating the direct intake rate kw1 and the indirect intake rate kw2 specifies in advance relationships of the first intake pipe pressure Pm1 and the cooling water temperature Tw to the direct intake rate kw1 and to the indirect intake rate kw2 by experiment or by analysis, stores the specified relationships in the form of maps in the ROM (not shown), and reads the direct intake rate kw1 and the indirect intake rate kw2 corresponding to a given first intake pipe pressure Pm1 and a given cooling water temperature Tw from these maps.

The engine ECU 24 computes a base correction amount Qfmwtmp as the sum of the product of the wall surface deposition variation ΔQmw and the direct intake rate kw1 and the product of a previous estimated wall surface deposition amount (previous Qtrn) and the indirect intake rate kw2 according to Equation (14) given below (step S126). The engine ECU 24 subsequently sets a correction amount Qfmw by lower limit guard of the base correction amount Qfmwtmp with a lower limit value Qfmwmin according to Equation (15) given below (step S128). The lower limit value Qfmwmin will be described later in detail. The engine ECU 24 computes a target amount of fuel injection Qf* by adding the correction amount Qfmw to the base amount of fuel injection Qftmp according to Equation (16) given below (step S130). After setting the target amount of fuel injection Qf*, the engine ECU 24 controls the fuel injection valve 127 to inject the fuel of the set target amount of fuel injection Qf* (step S140) and terminates this routine.

$$Qfmwtmp = \Delta Qmw \cdot kw1 + \text{previous } Qtrn \cdot kw2 \quad (14)$$

$$Qfmw = \max(Qfmwtmp, Qfmwmin) \quad (15)$$

$$Qf^* = Qftmp + Qfmw \quad (16)$$

Qtrn represents an estimated wall surface deposition amount or more specifically an amount of fuel estimated to deposit on the wall surface of the intake pipe 125a. This estimated wall surface deposition amount Qtrn may be computed from the direct intake rate kw1, the wall surface deposition variation ΔQmw and the indirection intake rate kw2 according to Equation (17) given below. In Equation (17), the first term on the right side shows an amount of fuel that is not taken into the combustion chamber 129 but newly deposits on the wall surface of the intake pipe 125a, out of the wall surface deposition variation ΔQmw. The second term on the right side shows an amount of fuel that is not separated from the wall surface of the intake pipe 125a (is not taken into the combustion chamber 129) but keeps depositing on the wall surface of the intake pipe 125a, out of the estimated previous wall surface deposition amount (previous Qtrn).

$$Qtrn = \Delta Qmw \cdot (1-kw1) + \text{previous } Qtrn \cdot (1-kw2) \quad (17)$$

The base correction amount Qfmwtmp is a value corresponding to a change in amount of fuel depositing on the wall surface of the intake pipe 125a. In the description below, correcting the base amount of fuel injection Qftmp using the correction amount Qfmw based on this base correction amount Qfmwtmp is called "wall surface deposition correction".

Figure 12:
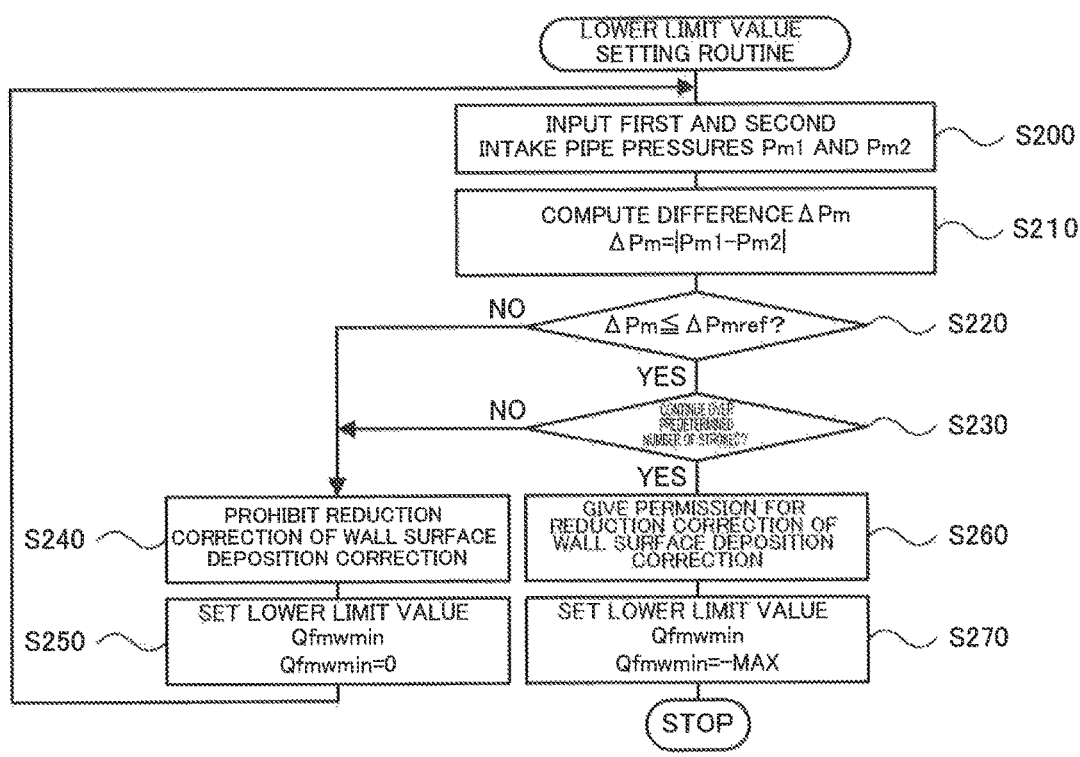
FIG. 12 is a flowchart showing an example of lower limit value setting routine performed by the engine ECU according to the embodiment.

The following describes the operation of the hybrid vehicle 20 of the embodiment having the above configuration or more specifically an operation of setting the lower limit value Qfmwmin. FIG. 12 is a flowchart showing an example of lower limit value setting routine performed by the engine ECU 24 of the embodiment. This routine is performed on completion of the start-time injection of the engine 22. For a time duration from the start of the fuel injection control of the engine 22 (start-time injection) to completion of the start-time injection, the engine ECU 24 prohibits reduction correction of wall surface deposition correction and sets value 0 to the lower limit value Qfmwmin. In this case, when the base correction amount Qfmwtmp is equal to or greater than the value 0, the base correction amount Qfmwtmp is set to the correction amount Qfmw. When the base correction amount Qfmwtmp is smaller than the value 0, on the other hand, the value 0 is set to the correction amount Qfmw. This avoids reduction correction of wall surface deposition correction during the start-time injection. As a result, this suppresses the amount of fuel injection from becoming insufficient at the start of the engine 22 and suppresses poor startability of the engine 22.

On the start of the lower limit value setting routine, the engine ECU 24 first inputs data including the first intake pipe pressure Pm1 and the second intake pipe pressure Pm2 (step S200). The first intake pipe pressure Pm1 denotes a current pressure (estimated value) of the air in the specified portion 126 according to the current throttle position θt as described above. The second intake pipe pressure Pm2 denotes a pressure (estimated value) of the air in the specified portion 126 during steady operation of the engine 22 at the current throttle position θt as described above. The input first intake pipe pressure Pm1 and second intake pipe pressure Pm2 are values computed based on the current throttle position θt by the above technique.

After the data input, the engine ECU 24 computes the absolute value of a difference by subtracting the second intake pipe pressure Pm2 from the first intake pipe pressure Pm1 as a difference ΔPm according to Equation (18) given below (step S210.

$$\Delta Pm = |Pm1 - Pm2| \quad (18)$$

The engine ECU 24 subsequently compares the difference ΔPm with a reference value ΔPmref (step S220). The reference value ΔPmref is a threshold value used to determine whether the actual intake pipe pressure of the engine 22 is likely to be stable. This reference value ΔPmref may be, for example, 1 kPa, 2 kPa or 3 kPa.

When the difference ΔPm is greater than the reference value ΔPmref at step S220, the engine ECU 24 determines that reduction correction of wall surface deposition correction is to be prohibited (step S240), sets the value 0 to the lower limit value Qfmwmin (step S250) and returns to step S200.

When the difference ΔPm is equal to or less than the reference value ΔPmref at step S220, on the other hand, the engine ECU 24 determines whether this state (hereinafter called "specific difference state") continues over a predetermined number of strokes nref of the engine 22 (step S230). The predetermined number of strokes nref denotes a number of strokes required to confirm that the actual intake pipe pressure of the engine 22 is stable. The predetermined number of strokes nref may be, for example, three strokes, four strokes or five strokes (number of strokes to rotate the crankshaft 26 of the four-stroke engine 22 by 540 degrees, 720 degrees and 900 degrees). Using the predetermined number of strokes nref, in addition to comparing the difference ΔPm with the reference value ΔPmref allows for the more accurate determination of whether the actual intake pipe pressure of the engine 22 is stable.

When it is determined at step S230 that the specific difference state does not continue over the predetermined number of strokes nref of the engine 22, the engine ECU 24 determines that reduction correction of wall surface deposition correction is to be prohibited (step S240), set the value 0 to the lower limit value Qfmwmin (step S250) and returns to step S200. In this case, when the base correction amount Qfmwtmp is equal to or greater than the value 0, the base correction amount Qfmwtmp is set to the correction amount Qfmw. When the base correction amount Qfmwtmp is less than the value 0, on the other hand, the value 0 is set to the correction amount Qfmw.

When it is determined at step S230 that the specific difference state continues over the predetermined number of strokes nref of the engine 22, the engine ECU 24 determines that the prohibition of reduction correction of wall surface deposition correction is removed and that permission is given for the reduction correction (step S260), sets a value (−MAX) to the lower limit value Qfmwmin (step S270) and terminates this routine. The value (−MAX) is a value smaller than a lower limit value in an expected range of the base correction amount Qfmwtmp (i.e., larger as the absolute value). In this case, the base correction amount Qfmwtmp is set to the correction amount Qfmw. In this case, it is expected that the actual intake pipe pressure of the engine 22 is stable, so that permission for reduction correction of wall surface deposition correction seems unlikely to cause any problem. After termination of this routine, the lower limit value Qfmwmin is kept at the value (−MAX) until the engine 22 is stopped.

As described above, the embodiment uses the condition that the specific difference state continues over the predetermined number of strokes nref of the engine 22, as the condition to remove the prohibition of reduction correction of wall surface deposition correction and give permission for the reduction correction. This further shortens the time duration between completion of the start-time injection or completion of starting the engine 22 (complete explosion) and permission for the reduction correction of wall surface deposition correction. For example, when the difference ΔPm is equal to or less than the reference value ΔPmref on completion of the start-time injection and the rotation speed Ne of the engine 22 is about 1000 rpm, permission may be given for the reduction correction of wall surface deposition correction in about 0.1 second that corresponds to the predetermined number of strokes nref of the engine 22. As described above, when the stop condition of the engine 22 is satisfied before the predetermined reference time tref (for example, 3 seconds or 5 seconds) has elapsed since completion of starting the engine 22, the configuration of the embodiment idles the engine 22 before elapse of the predetermined reference time tref and performs the process of stopping the engine 22 after elapse of the predetermined reference time tref. The long time duration between completion of the start-time injection and permission for the reduction correction of wall surface deposition correction is likely to shift the air-fuel ratio to the rich side and cause deterioration of emission, for example, in the case where the required power Pe* of the engine is reduced in a relatively short time period after completion of the start-time injection (for example, in 1 second or 2 seconds) to idle the engine 22. This is also likely to increase the air-fuel ratio to be relatively high and shifted to the rich side and cause deterioration of emission, for example, in the case where the start-time injection is performed to restart the engine 22 after a stop. The configuration of the embodiment, on the other hand, further shortens the time duration between completion of the start-time injection or completion of starting the engine 22 and permission for the reduction correction of wall surface deposition correction. This suppresses the air-fuel ratio from being shifted to the rich side and suppresses deterioration of emission, for example, in the case where the required power Pe* of the engine is reduced in a relatively short time period after completion of the start-time injection to idle the engine 22. This also suppresses the air-fuel ratio from being increased to relatively high and being shifted to the rich side and suppresses deterioration of emission, for example, in the case where the start-time injection is performed to restart the engine 22 after a stop.

Figure 13:
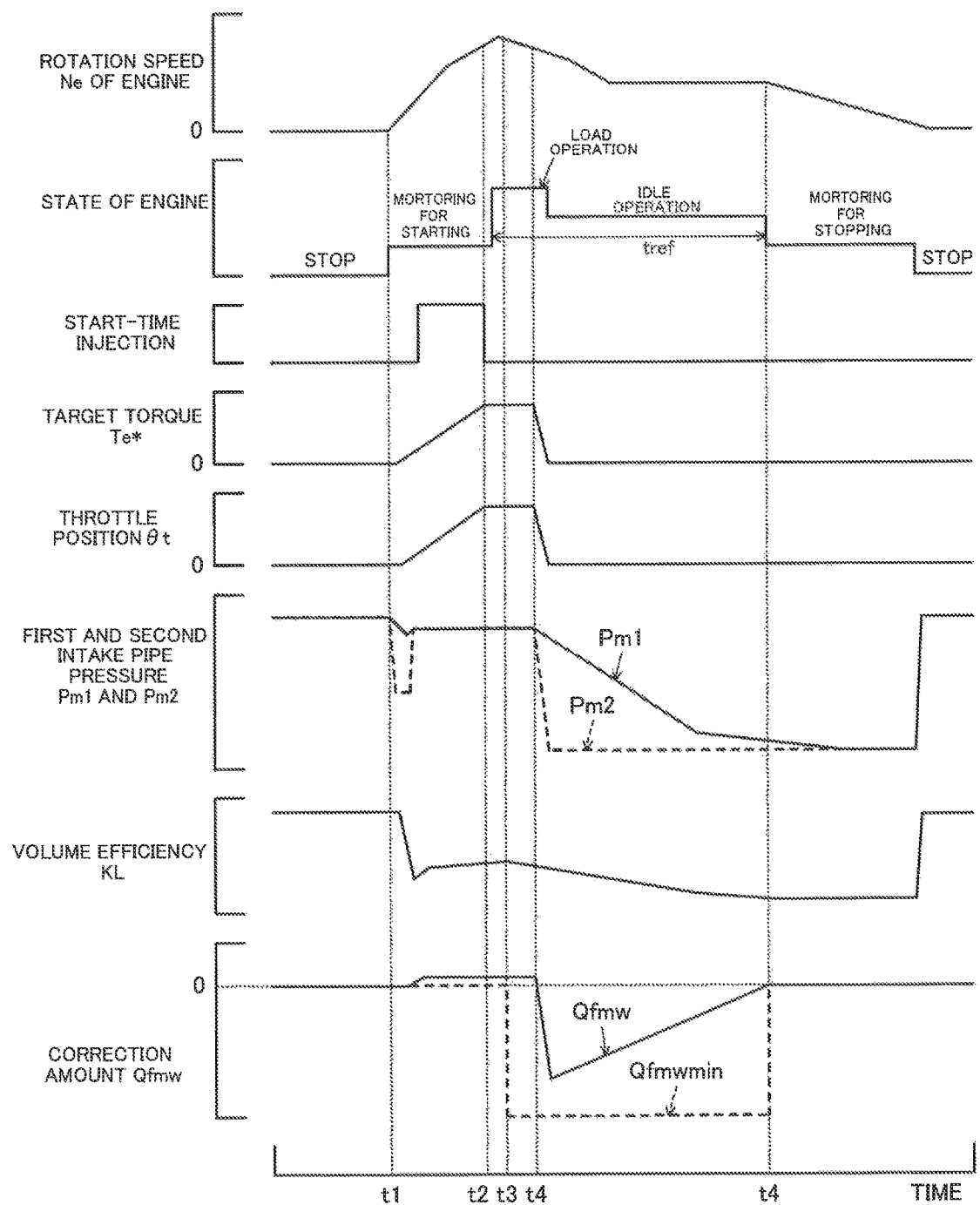
FIG. 13 is a chart showing time changes of rotation speed Ne of the engine, state of the engine, start-time injection, target torque Te*, throttle position θt, first intake pipe pressure Pm1, second intake pipe pressure Pm2, load factor of the engine (volume efficiency KL) and correction amount Qfmw.

FIG. 13 is a chart showing time changes of the rotation speed Ne of the engine 22, the state of the engine 22, the start-time injection, the target torque Te*, the throttle position θt, the first intake pipe pressure Pm1, the second intake pipe pressure Pm2, the load factor of the engine 22 (volume efficiency KL) and the correction amount Qfmw. As illustrated, in response to a request for starting the engine 22 at a time t1, the engine 22 is motored by means of the motor MG1, and the start-time injection is performed to start the engine 22. The throttle position θt is gradually increased with a gradual increase in required output of the engine 22. The start-time injection of the engine 22 is completed at a time t2. At a subsequent time t3, it is determined that the specific difference state that the difference ΔPm is equal to or less than the reference value ΔPmref continues over the predetermined number of strokes nref of the engine 22. The lower limit value Qfmwmin is then changed from the value 0 to the value (−MAX), in order to remove the prohibition of reduction correction of wall surface deposition correction and give permission for the reduction correction. This further shortens the time duration between completion of the start-time injection or completion of starting the engine 22 and permission for the reduction correction of wall surface deposition correction. As described above, for example, when the difference ΔPm is equal to or less than the reference value ΔPmref on completion of the start-time injection and the rotation speed Ne of the engine 22 is about 1000 rpm, permission may be given for the reduction correction of wall surface deposition correction in about 0.1 second. This suppresses the air-fuel ratio from being shifted to the rich side and suppresses deterioration of emission when the required output of the engine 22 is reduced to idle the engine 22 at a time t4 when only a relatively short time period (for example, 1 second or 2 seconds) has elapsed since completion of the start-time injection.

The hybrid vehicle 20 of the embodiment described above prohibits reduction correction of wall surface deposition correction until satisfaction of the predetermined condition since a start of the engine 22 (completion of the start-time injection or completion of starting), while giving permission for the reduction correction on satisfaction of the predetermined condition. The predetermined condition used is the condition that the specific difference state that the difference ΔPm between the first intake pipe pressure Pm1 and the second intake pipe pressure Pm2 is equal to or less than the reference value ΔPmref continues over the predetermined number of strokes nref. This further shortens the time duration between completion of the start-time injection or completion of starting the engine 22 and permission for the reduction correction of wall surface deposition correction. This suppresses the air-fuel ratio from being shifted to the rich side and suppresses deterioration of emission, for example, in the case where the required power Pe* of the engine is reduced in a relatively short time period after completion of the start-time injection to idle the engine 22. This also suppresses the air-fuel ratio from being increased to relatively high and being shifted to the rich side and suppresses deterioration of emission, for example, in the case where the start-time injection is performed to restart the engine 22 after a stop.

The hybrid vehicle 20 of the embodiment uses the condition that the specific difference state continues over the predetermined number of strokes nref of the engine 22, as the predetermined condition. The predetermined condition may alternatively be a condition that the specific difference state continues for a predetermined time period. The predetermined time period may be, for example, a time duration corresponding to the predetermined number of strokes nref of the engine 22. The predetermined condition may also be a condition that falls into the specific difference state or more specifically a condition that is satisfied irrespective of the predetermined number of strokes nref or the predetermined reference time tref when falling into the specific difference state.

Figure 14:
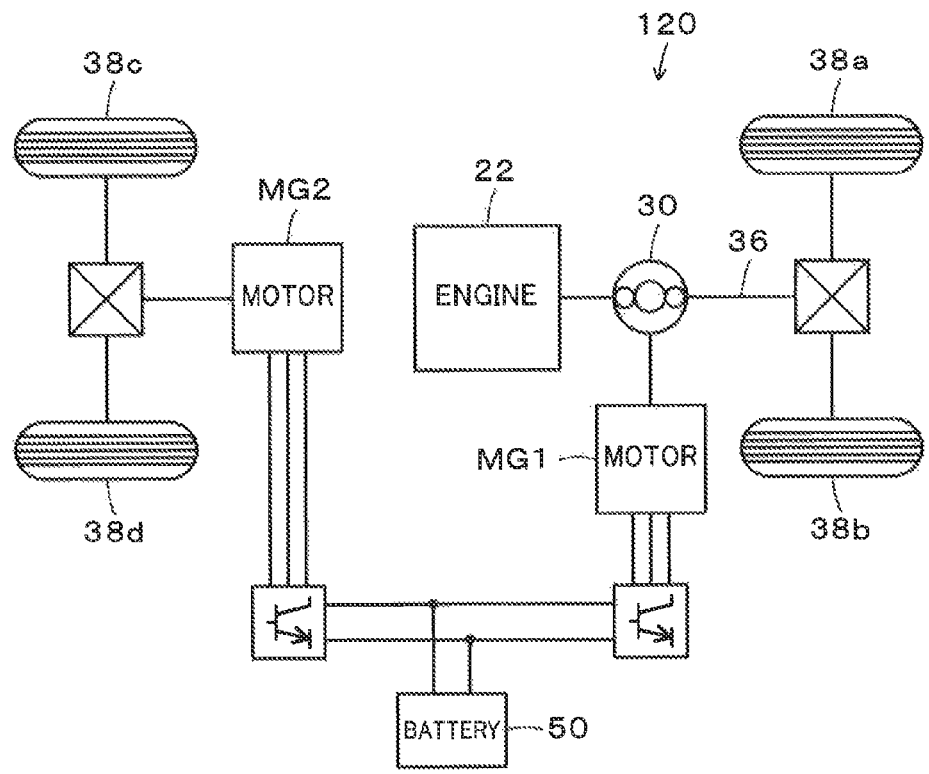
FIG. 14 is a configuration diagram illustrating the schematic configuration of a hybrid vehicle according to a modification.

The hybrid vehicle 20 of the embodiment is configured to output the power from the motor MG2 to the driveshaft 36 linked with the drive wheels 38a and 38b. As illustrated in FIG. 14, however, a hybrid vehicle 120 of a modification may be configured to output the power from a motor MG2 to an axle (axle inked with wheels 38c and 38d in FIG. 14) that is different from an axle linked with a driveshaft 36 (axle linked with drive wheels 38a and 38b.

Figure 15:
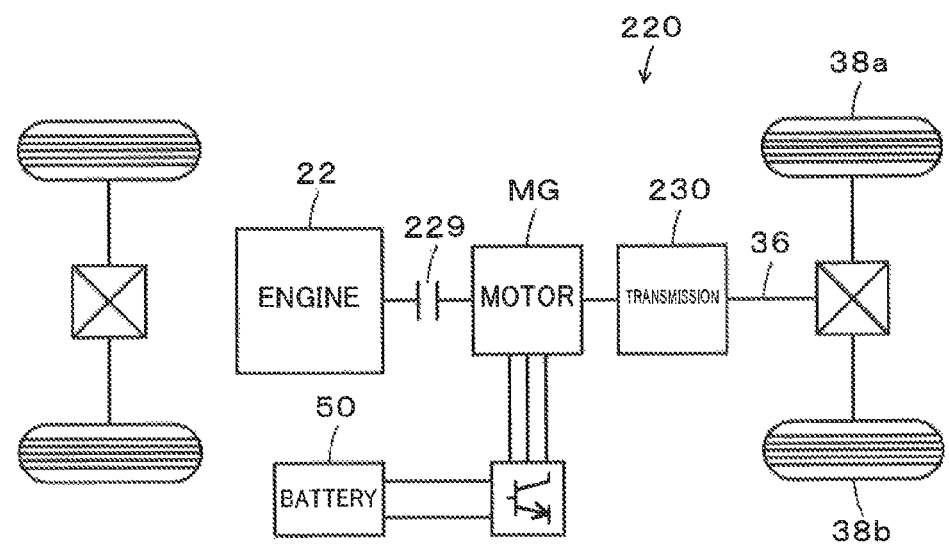
FIG. 15 is a configuration diagram illustrating the schematic configuration of a hybrid vehicle according to another modification.

The hybrid vehicle 20 of the embodiment is configured to output the power from the engine 22 via the planetary gear 30 to the driveshaft 36 linked with the drive wheels 38a and 38b and output the power from the motor MG2 to the driveshaft 36. As illustrated in FIG. 15, however, a hybrid vehicle 220 of a modification may be configured to connect a motor MG via a transmission 230 with a driveshaft 36 linked with drive wheels 38a and 38b and connect an engine 22 via a clutch 229 with a rotating shaft of the motor MG. The hybrid vehicle 220 is configured to output the power from the engine 22 via the rotating shaft of the motor MG and the transmission 230 to the driveshaft 36 and output the power from the motor MG via the transmission 230 to the driveshaft 36.

Figure 16:
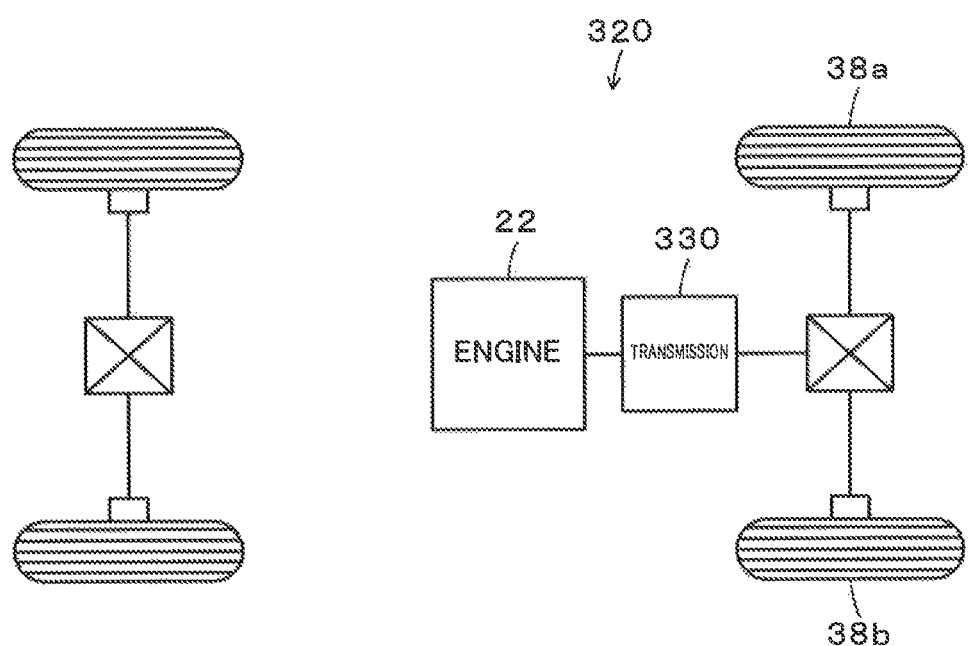
FIG. 16 is a configuration diagram illustrating the schematic configuration of an automobile according to another modification.

The hybrid vehicle 20 of the embodiment is configured to include the engine 22 for driving and the motors MG1 and MG2. As illustrated in FIG. 16, however, an automobile 320 of a modification may be configured to include an engine 22 and a transmission 320 provided to change the power from the engine 22 and output the changed power to drive wheels 38a and 38b.

In the automobile of the invention, the predetermined condition may be a condition satisfied when the specific difference state that the difference is equal to or less than the predetermined value continues over the predetermined number of strokes of the engine or for the predetermined time period. The "predetermined number of strokes" herein denotes the number of strokes required to confirm that the actual pressure of the intake pipe is stable and may be three strokes, four strokes or five strokes of the four-stroke engine that outputs power in four strokes, i.e., intake, compression, expansion and exhaust. The "predetermined time period" herein denotes a time duration required to confirm that the actual pressure of the intake pipe is stable and may be a time duration corresponding to the predetermined number of strokes. Using such a predetermined condition allows for the more accurate determination of whether the actual pressure of the intake pipe is stable.

The following describes the correspondence relationship between the primary components of the embodiment and the primary components of the invention described in Summary of Invention. The engine 22 of the embodiment corresponds to the "engine", and the engine ECU 24 corresponds to the "controller".

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The invention is applicable to, for example, manufacturing industries of automobiles.

The invention claimed is:

1. An automobile, comprising:
   an engine that is configured to have a fuel injection valve that injects a fuel into an intake pipe; and
   a controller that is configured to set a target amount of fuel injection by providing a base amount of fuel injection with increase correction or reduction correction corresponding to a change in amount of the fuel depositing on a wall surface of the intake pipe and to control the engine to cause the fuel of the target amount of fuel injection to be injected by the fuel injection valve, wherein
   the controller prohibits the reduction correction until satisfaction of a predetermined condition since a start of the engine and gives permission for the reduction correction on satisfaction of the predetermined condition, wherein
   the predetermined condition is a condition satisfied when a difference between a first intake pipe pressure and a second intake pipe pressure becomes equal to or less than a predetermined value, wherein the first intake pipe pressure is a current pressure in the intake pipe estimated using a throttle-passing air flow that denotes a flow rate of the air passing through a throttle valve per unit time at a current throttle position, and the second intake pipe pressure is a pressure in the intake pipe when the throttle-passing air flow is equal to an in-cylinder intake air flow that denotes a flow rate of the air flowing into a combustion chamber per unit time.

2. The automobile according to claim 1, wherein the predetermined condition is satisfied when a specific difference state that the difference is equal to or less than the predetermined value continues over a predetermined number of strokes of the engine or for a predetermined time period.

* * * * *